UNITED STATES PATENT OFFICE.

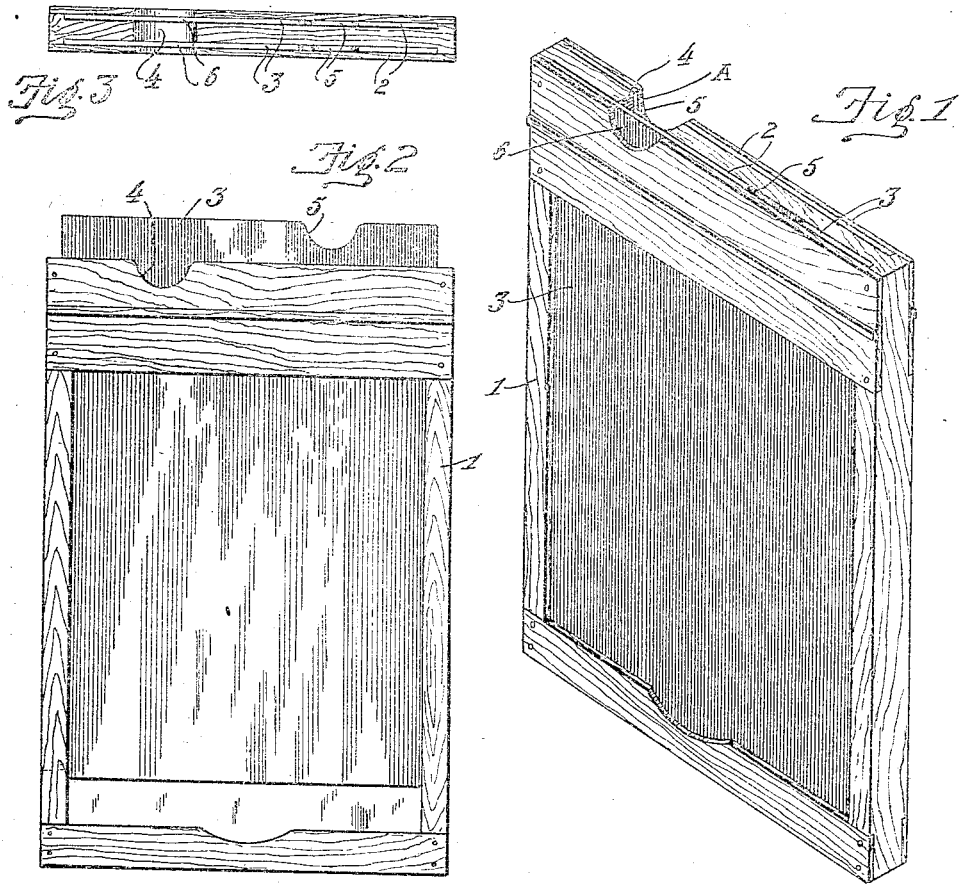

RAYMOND F. ISEMAN AND EUGENE L. SNYDER, OF CANTON, OHIO.

PHOTOGRAPHIC-PLATE HOLDER.

1,355,146.    Specification of Letters Patent.    Patented Oct. 12, 1920.

Application filed December 2, 1919. Serial No. 342,011.

*To all whom it may concern:*

Be it known that we, RAYMOND F. ISEMAN and EUGENE L. SNYDER, both citizens of the United States, both residing at Canton, in the county of Stark and State of Ohio, have invented a new and useful Photographic-Plate Holder, of which the following is a specification.

This invention relates to improvements in photographic plate holders; and has for its objects the provision of a plate holder designed to prevent double exposure of the plates carried therein, the plate holder and the slide being so constructed that after exposure of the plate and the return of the slide to its place in the plate holder, it cannot be again inadvertently exposed; the plate holder and the slide each being provided with means at one side of their longitudinal centers arranged to register when the plate has been exposed and the slide replaced, to prevent the accidental removal of the slide, these means also acting as a warning to the operator, informing him of the fact that the plate has been exposed should he carelessly attempt to again remove the slide; other objects being the provision of a plate holder which is simple and inexpensive in construction and durable and efficient in operation.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a perspective view of a plate holder embodying the invention, provided with two slides, one being shown in the exposed and the other in the unexposed position.

Fig. 2 is a front elevation of a plate holder, showing a slide in the act of being removed to expose the plate.

Fig. 3 is an end view of the plate holder, showing both slides in the unexposed position.

A practical embodiment of the invention is disclosed in the accompanying drawings, forming a part of this specification in which similar numerals of reference indicate corresponding parts throughout the several views.

Referring to the construction illustrated the plate holder 1, may be of any usual and well known construction and is provided at its outer or working end with the open slots 2 which receive the usual slides 3, covering the photographic plates and arranged to be withdrawn to expose the same.

This end of the plate holder is provided at a point spaced from its longitudinal center with a notch or depression 4, extending entirely across the thickness of the plate holder and each slide is provided with a similar notch 5, equally spaced from its longitudinal center.

In loading the plate holder the slides are placed in position within the holder covering the unexposed plates, the notches 5 in the slides being positioned upon the opposite side of the center from the notch 4 in the plate holder, as best illustrated in Fig. 3 the outer edge portion of each slide protruding through the notch 4 in the plate holder as shown at 6, providing a finger portion which may be grasped between the thumb and forefinger in order to remove the slide to expose the plate.

When the slide is returned to place in the plate holder, after exposure of the plate, it should be reversed, bringing the notch 5 therein into alinement with the notch 4 in the plate holder, causing said notches to register as shown at A, in Fig. 1. Should the operator inadvertently attempt to again withdraw the slide he will find this impossible as there will be no portion of the slide protruding through the notch in the plate holder and his thumb and finger will meet within the notch 5, notifying him that the plate has been exposed.

In order to remove the slide from over an exposed plate, for the purpose of removing the plate for developing, it is only necessary to apply a slight pressure of the fingers against the outer face of the slide to remove the slide sufficiently to protrude its outer edge beyond the edge of the plate holder, when it may be grasped and easily removed in the usual manner.

The slides may be marked "Exposed" and "Unexposed" upon its opposite faces, in the usual manner, but from the accompanying drawings and the above description it will be seen that this marking of the slides is not necessary as, should the operator inadvertently attempt to remove the slide covering an exposed plate he would not only be immediately notified that he was attempting to withdraw the slide from over an exposed plate, but he would find it impossible to remove said slide as no part thereof would protrude beyond the edge of the plate holder to provide a finger grip.

Although the drawings and above specification disclose the best mode in which we have contemplated embodying our invention we desire to be not limited to the details of such disclosure, for, in the further practical application of our invention, many changes in form and construction may be made, as circumstances require or experience suggests, without departing from the spirit of the invention, within the scope of the appended claims.

We claim:

1. A plate holder and a removable slide therefor, the plate holder having a cut away portion in its working end at one side of its longitudinal center through which the end portion of the slide protrudes forming a finger grip, the slide being provided in its end with a similar cut away portion equally spaced from its longitudinal center and arranged to register with the cut away portion in the plate holder, after the slide has been reversed to prevent removal of the slide, the remaining portions of the edges of the plate holder and slide being straight.

2. A plate holder and a removable slide therefor, each having a straight, continuous working edge with the exception of a notch equally spaced from the longitudinal center of each member, said notches arranged to register when the slide has been reversed after the exposure of a plate to prevent accidental removal of the slide.

In testimony that we claim the above, we have hereunto subscribed our names.

RAYMOND F. ISEMAN.
EUGENE L. SNYDER.